US012703479B2

(12) United States Patent
Schlipf et al.

(10) Patent No.: US 12,703,479 B2
(45) Date of Patent: Aug. 11, 2026

(54) WING FOR AN AIRCRAFT

(71) Applicant: Airbus Operations GmbH, Hamburg (DE)

(72) Inventors: Bernhard Schlipf, Bremen (DE); Dennis Krey, Bremen (DE)

(73) Assignee: Airbus Operations GmbH, Hamburg (DE)

(*) Notice: Subject to any disclaimer, the term of this patent is extended or adjusted under 35 U.S.C. 154(b) by 0 days.

(21) Appl. No.: 19/380,493

(22) Filed: Nov. 5, 2025

(65) Prior Publication Data

US 2026/0125147 A1 May 7, 2026

(30) Foreign Application Priority Data

Nov. 7, 2024 (DE) ......................... 102024132504.6

(51) Int. Cl.
*B64C 9/02* (2006.01)
*B64C 3/38* (2006.01)
*B64C 9/08* (2006.01)

(52) U.S. Cl.
CPC .................. *B64C 9/02* (2013.01); *B64C 3/38* (2013.01); *B64C 9/08* (2013.01)

(58) Field of Classification Search
CPC .... B64C 9/22; B64C 9/24; B64C 9/26; B64C 9/02; B64C 13/38; B64C 3/38; B64C 3/30
See application file for complete search history.

(56) References Cited

U.S. PATENT DOCUMENTS

| | | | | |
|---|---|---|---|---|
| 4,915,327 A * | 4/1990 | Ellmers | B64C 13/30 244/210 |
| 10,836,465 B2 * | 11/2020 | Schlipf | B64C 13/28 |
| 11,286,033 B2 * | 3/2022 | Lorenz | B64C 9/22 |
| 11,731,754 B2 * | 8/2023 | Good | B64C 9/24 244/99.2 |
| 11,820,512 B2 * | 11/2023 | Huber | B64C 3/50 |
| 2014/0339358 A1 | 11/2014 | Swartley et al. | |
| 2023/0026667 A1 | 1/2023 | Walker et al. | |

FOREIGN PATENT DOCUMENTS

EP 2733064 A1 5/2014

OTHER PUBLICATIONS

Search Report for Application No. DE 10 2024 132 504.6, eight pages, dated Jul. 2, 2025.

* cited by examiner

*Primary Examiner* — Arfan Y. Sinaki

(74) *Attorney, Agent, or Firm* — Nixon & Vanderhye, PC

(57) ABSTRACT

A wing for an aircraft including a main wing and a leading edge high lift assembly having a slat and a connection assembly movably connecting the slat to the main wing, such that the slat is movable between a retracted position, a first extended position, and a second extended position. The connection assembly includes an elongate slat track that extends along a track longitudinal axis between a first end and a second end and has an intermediate portion between the first and second ends. The first end and/or the intermediate portion of the slat track is mounted to the slat, the slat track is mounted to the main wing by a roller bearing such that the slat track is movable along the track longitudinal axis. The connection assembly includes a slat angle mechanism mounted to the slat and configured to control the angle of the slat about the slat axis when the slat is moved between the retracted position, the first extended position and the second extended position.

16 Claims, 6 Drawing Sheets

1
2
3
3
4
5
6
7
9,91
9,93
67
95
97

97
67
95
27,53
5
27,53
75
71
35
31,32
73
33
27,53
10
9
29
22
3
7
6
13

55
41
49
55
29
41
49
43
17
33
43
29
75
17
57
59
57
39
59
55
55
39
55
61
55
61

7
29
33
5
3

WING FOR AN AIRCRAFT

CROSS REFERENCE TO RELATED APPLICATION

This application claims priority to German Application DE 102024132504.6, filed Nov. 7, 2024, the entire contents of which is hereby incorporated by reference.

BACKGROUND

The present disclosure elates to a wing for an aircraft. Further aspects of the disclosure relate to a leading-edge high lift assembly for such a wing, as well as to an aircraft comprising such a wing and/or comprising such a leading-edge high lift assembly.

The described wing for an aircraft comprises a main wing and a leading-edge high lift assembly, the leading-edge high lift assembly comprising a slat and a connection assembly movably connecting the slat to the main wing such that the slat is movable relative to the main wing between a retracted position and several extended positions, in particular a first extended position and a second extended position. The first extended position relates to a partly extended position that is taken during take-off of the respective aircraft, while the second extended position relates to a fully extended position that is taken during approach and landing of the respective aircraft.

The connection assembly comprises an elongate slat track that extends along a track longitudinal axis between a first end and a second end and that has an intermediate portion between the first and second ends. The slat track may have a curved or straight form along the track longitudinal axis. At least one, or both, of the first end and the intermediate portion of the slat track is/are mounted to the slat. The first end may correspond to a front end of the slat track, e.g. the end positioned towards the intended direction of forward motion of the wing during flight of an aircraft. The first end of the slat track may be mounted to the slat by any appropriate means, e.g. by one or more spherical bearings. The slat track is mounted to the main wing by a roller bearing such that the slat track is movable along the track longitudinal axis, in particular along a predefined travel path, such as between a stowed position when the slat is in the retracted position, a first deployed position when the slat is in the first extended position, and a second deployed position when the slat is in the second extended position.

The slat track may take the form of, for example, a C-shape, such that its surface lies opposite the circumferential surface of the roller bearing, wherein the distance between an upper surface and a lower surface of the slat track is larger than a diameter of a roller bearing, such that the roller bearing may engage only one of the upper surface or the lower surface of the slat track at any one time. I.e. the distance between the upper and lower surfaces of the slat track is selected such that a clearance is provided between the roller bearing and either the upper surface or the lower surface of the slat track, such that the roller bearing cannot engage with the upper and lower surfaces of the slat track at the same time, thereby becoming wedged therein.

Similar wings are known in the art. Some known wings employ sealed slats the trailing edge of which is in contact with the leading edge of the main wing at all positions of the slat, so that there is never a gap between the trailing edge of the slat and the leading edge of the main wing. Avoiding a gap reduced aerodynamic drag and noise. Other wings have slats the trailing edge of which is spaced from the leading edge of the main wing by a gap at all extended positions of the slat. Such a gap guides fresh air flow from underneath the wing to the upper side of the wing, thereby inhibiting flow separation and thus increasing lift.

SUMMARY

Therefore, the disclosure contemplates providing a wing having a beneficial ratio of aerodynamic performance and noise generated by extension of the slat.

The disclosure is directed toward the slat track mounted to the slat rotatably about a slat axis. The slat axis may extend in a span direction and/or in parallel to a trailing edge of the slat and/or in parallel to a leading edge of the main wing and/or perpendicular to the track longitudinal axis. Further, the connection assembly comprises a slat angle mechanism mounted to the slat, fixedly mounted to the slat, and may be mounted to the main wing, wherein the slat angle mechanism is configured to control the angle of the slat about the slat axis when the slat is moved between the retracted position, the first extended position and the second extended position. By controlling the angle of the slat about the slat axis the position of the trailing edge of the slat relative to the leading edge of the main wing can be controlled throughout the movement path of the slat between the retracted position, the first extended position and the second extended position. I.e., it can be controlled in which position along the movement path of the slat the trailing edge of the slat rests against the leading edge of the main wing, so that fluid is restricted from passing between the slat and the main wing, and in which position a gap is formed between the trailing edge of the slat and the leading edge of the main wing for fluid to pass through. In such a way, lift, drag, and noise generated can be adjusted to some extent along the movement path of the slat between the retracted position, the first extended position and the second extended position, so as to be most beneficial for the respective flight situations of cruise flight, take-off, and approach and landing. This means, an ideal ratio of aerodynamic performance and noise generated by extension of the slat can be obtained.

According to an exemplary embodiment, the slat angle mechanism is configured to control the angle of the slat about the slat axis in such a way that in the retracted position and in the first extended position, the slat rests against the main wing, in particular the trailing edge of the slat rests against the leading edge of the main wing, so that fluid cannot pass between the slat and the main wing, whereas in the second extended position, a gap is formed between the trailing edge of the slat and the leading edge of the main wing for fluid to pass through. In such a way, the benefits of a sealed slat and the benefits of a slat configuration with gap are combined. In particular, for take-off when the aircraft accelerates, little drag is desired as well as little noise, so a closed gap in the first extended position is beneficial. Similar is true for cruise flight. For approach and landing, in turn, when the aircraft requires high lift in order to achieve minimum speed, a gap is beneficial in the fully extended position of the slat. In such a way, an ideal ratio of aerodynamic performance and noise generated by extension of the slat is obtained.

According to an exemplary embodiment, the slat angle mechanism comprises a slat angle lever and a lever guide. The slat angle lever is mounted to the slat, may be fixedly mounted to the slat, by its one end, and is guided by the lever guide, or by its other end. The lever guide may be mounted to the main wing. In such a way, a simple and efficient slat angle mechanism is provided.

In particular, the lever guide may be formed as a lever rail and the slat angle lever comprises a slat angle roller engaging the lever rail to roll along the lever rail in a guided manner. In such a way, a simple, reliable and efficient slat angle mechanism is provided.

Furthermore, the lever guide forms a guide path along which the slat angle lever is guided, wherein the guide path is formed in such a way that the slat angle lever controls the angle of the slat about the slat axis in such a way that in the retracted position and in the first extended position, the trailing edge of the slat rests against the leading edge of the main wing, whereas in the second extended position, a gap is formed between the trailing edge of the slat and the leading edge of the main wing, for fluid to pass through. To achieve this, the form of the guide path can be straight or can be curved, depending on the form of the slat, of the main wing, and of the slat track and its travel path. In such a way, a simple and efficient slat angle mechanism is provided.

According to an exemplary embodiment, the slat angle mechanism is arranged in the same chord plane, i.e. in the same span layer, meaning the same level in span direction, as the slat track. In such a way, a cut-out in the leading-edge panel of the main wing can have a minimum size.

In particular, the slat angle mechanism may be arranged above or below the slat track with respect to a normal position of the related aircraft on the ground, i.e. before or behind the slat track when viewed along a thickness direction of the wing. This relates to a space-efficient arrangement that can effectively adjust the slat angle.

Moreover, the slat track may have a form adapted to give space for the slat angle mechanism, in particular for the slat angle lever, to be arranged and move in close proximity to the slat track, including in contact to the slat track, to allow for a minimum required space by the slat track and slat angle mechanism and thus a minimum required cut-out in the leading edge panel of the main wing.

Furthermore, the slat track may have a cross-sectional form across the track longitudinal axis including a first side portion and a second side portion spaced from one another in the span direction, and a connection portion connecting the first and second side portions, to form at least one cavity partially surrounded by the first and second side portions as well as by the connection portion. Such a form might be for example an H-, U-, or Π-form. The cavity may extend in an elongate manner in parallel to the track longitudinal axis. The cavity is open in an upwards and/or downwards direction with respect to a normal position of the related aircraft on the ground. The slat angle mechanism, in particular the slat angle lever, extends at least partially within the cavity and moves within the cavity relative to the slat track, e.g. in a direction essentially in parallel to the track longitudinal axis. In such a way, a very compact arrangement is provided that can lead to a minimum cut-out in the leading edge panel of the main wing.

According to an exemplary embodiment, the slat angle mechanism is arranged in a different chord plane as the slat track, i.e. offset from the slat track with respect to the span direction. Such an arrangement might be advantageous e.g. due to space constraints in the chord plane of the slat track.

According to an exemplary embodiment, the roller bearing comprises at least two roller units, for example three roller units, mounted to the main wing and configured to engage a corresponding engagement surface at the slat track. The engagement surface might be on upper and/or lower surface of slat track, so that the engagement surfaces face away from one another, or might be provided in a recess formed in one or both lateral sides of the slat track, so that the engagement surfaces face towards one another. In such a way, a very simple, compact, reliable and efficient roller bearing is provided.

According to an exemplary embodiment, the roller bearing comprises a first roller unit mounted to the second end of the slat track, i.e. to its rear end, and configured to engage a guide rail mounted to the main wing, may be fixedly mounted to the main wing. The roller bearing further comprises a second roller unit mounted to the main wing, may be fixedly mounted to the main wing, and configured to engage a corresponding engagement surface at the slat track. The engagement surface might be e.g. on an upper and/or lower surface of slat track, so that the engagement surfaces face away from one another, or might be provided in a recess formed in one or both lateral sides of the slat track, so that the engagement surfaces face towards one another. In such a way, an alternative simple, compact, reliable and efficient roller bearing is provided.

According to an exemplary embodiment, the wing further comprises a drive unit mounted to the main wing and coupled to the slat track for moving the slat track and hence the slat between the retracted position, the first extended position, and the second extended position. The drive unit may comprise a drive pinion mounted to the main wing in a manner driven by e.g. a motor and engaging a rack provided at the slat track. Alternatively, the drive unit comprises a drive linkage including at least one drive link and driven by a rotating actuator or a linear actuator mounted at the main wing. In such a way, simple, reliable and efficient drive units are provided.

A further aspect of the disclosure relates to a leading-edge high lift assembly for the wing according to any of the afore-described embodiments. The leading-edge high lift assembly comprises a slat and a connection assembly configured for movably connecting the slat to the main wing, such that the slat is movable between a retracted position, a first extended position, and a second extended position. The connection assembly comprises a slat track that extends along a track longitudinal axis between a first end and a second end and has an intermediate portion between the first and second ends. The first end and/or the intermediate portion of the slat track is configurable to be mounted to the slat. The slat track is configurable to be mounted to the main wing by a roller bearing such that the slat track is movable along the track longitudinal axis. The slat track is configurable to be mounted to the slat rotatably about a slat axis. The connection assembly comprises a slat angle mechanism configurable to be mounted to the slat and configurable to control the angle of the slat about the slat axis when the slat is moved between the retracted position, the first extended position and the second extended position. The features and effects described above in connection with the wing apply vis-à-vis also to the leading edge high lift assembly.

A further aspect of the disclosure relates to an aircraft comprising a wing according to any of the afore-described embodiments, and/or comprising a leading-edge high lift assembly according to the afore-described embodiments. The features and effects described above in connection with the wing and in connection with the leading-edge high lift assembly apply vis-à-vis also to the aircraft.

BRIEF DESCRIPTION OF THE DRAWINGS

The disclosure will be better understood when reading the following description, which is given solely by way of example and with reference to the appended drawings, in which.

DETAILED DESCRIPTION OF SOME EMBODIMENTS

Some embodiments will now be described with reference to the Figures.

Figure 1:
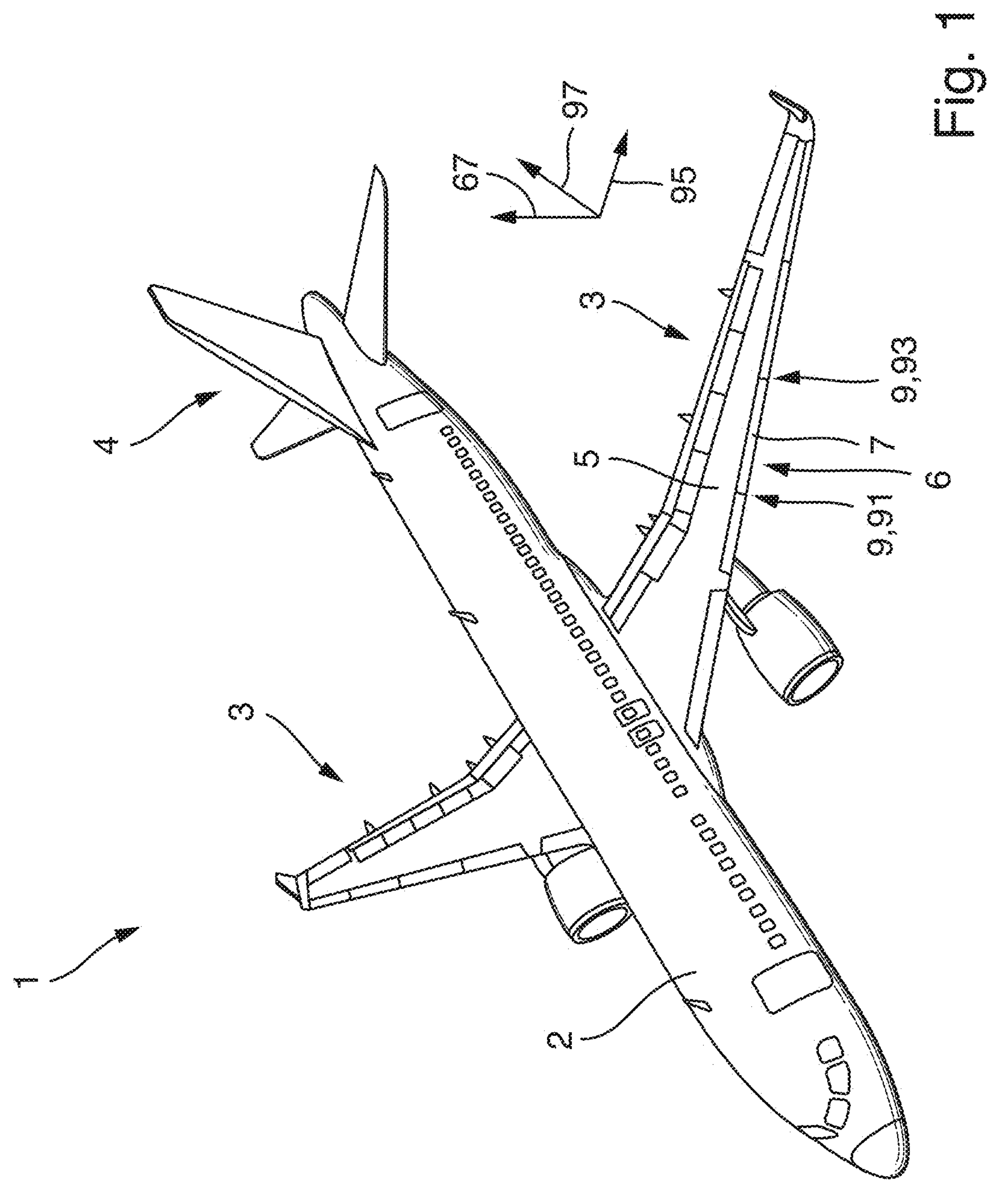
FIG. 1 is a perspective view of an aircraft.

In FIG. 1 an aircraft 1 according to an exemplary embodiment is illustrated. The aircraft 1 comprises a fuselage 2, wings 3, and a tail unit 4. Each wing 3 comprises a main wing 5 and a leading edge high lift assembly 6 including a slat 7 and a connection assembly 9 connecting the slat 7 to the main wing 5 such that the slat 7 is movable relative to the main wing 5.

As shown in FIG. 1, the connection assembly 9 relates to a first connection assembly 91, and the wing 3 comprises a second connection assembly 93 connecting the slat 7 to the main wing 5 in a position spaced apart from the first connection assembly 91 in a span direction 95, and wherein the second connection assembly 93 is formed as the first connection assembly 91.

Figure 2A:
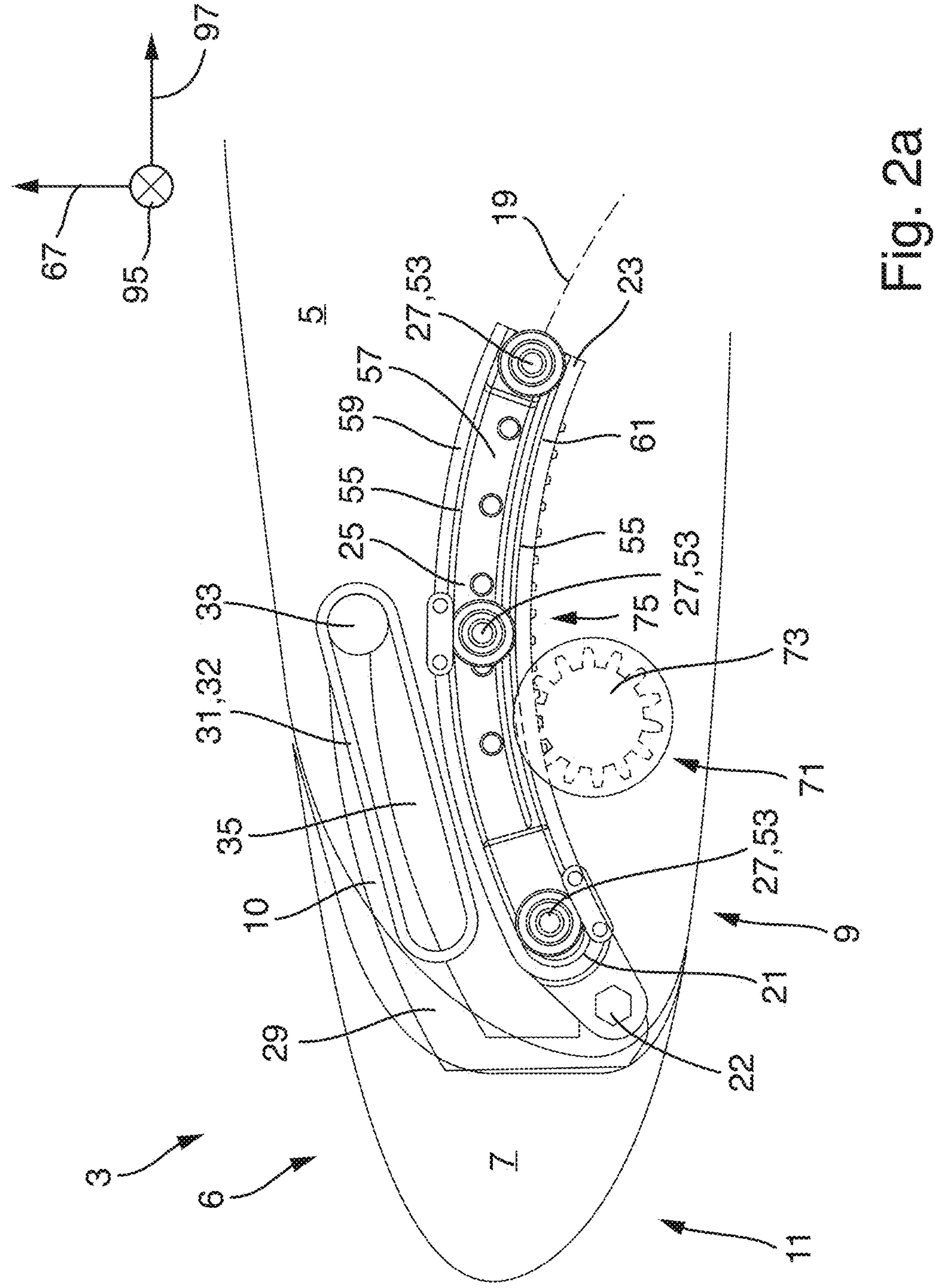
FIGS. 2*a* to 2*c* are three side views of a wing according to an exemplary embodiment with a slat in the retracted position, in the first extended position, and in the second extended position.
Figure 2B:
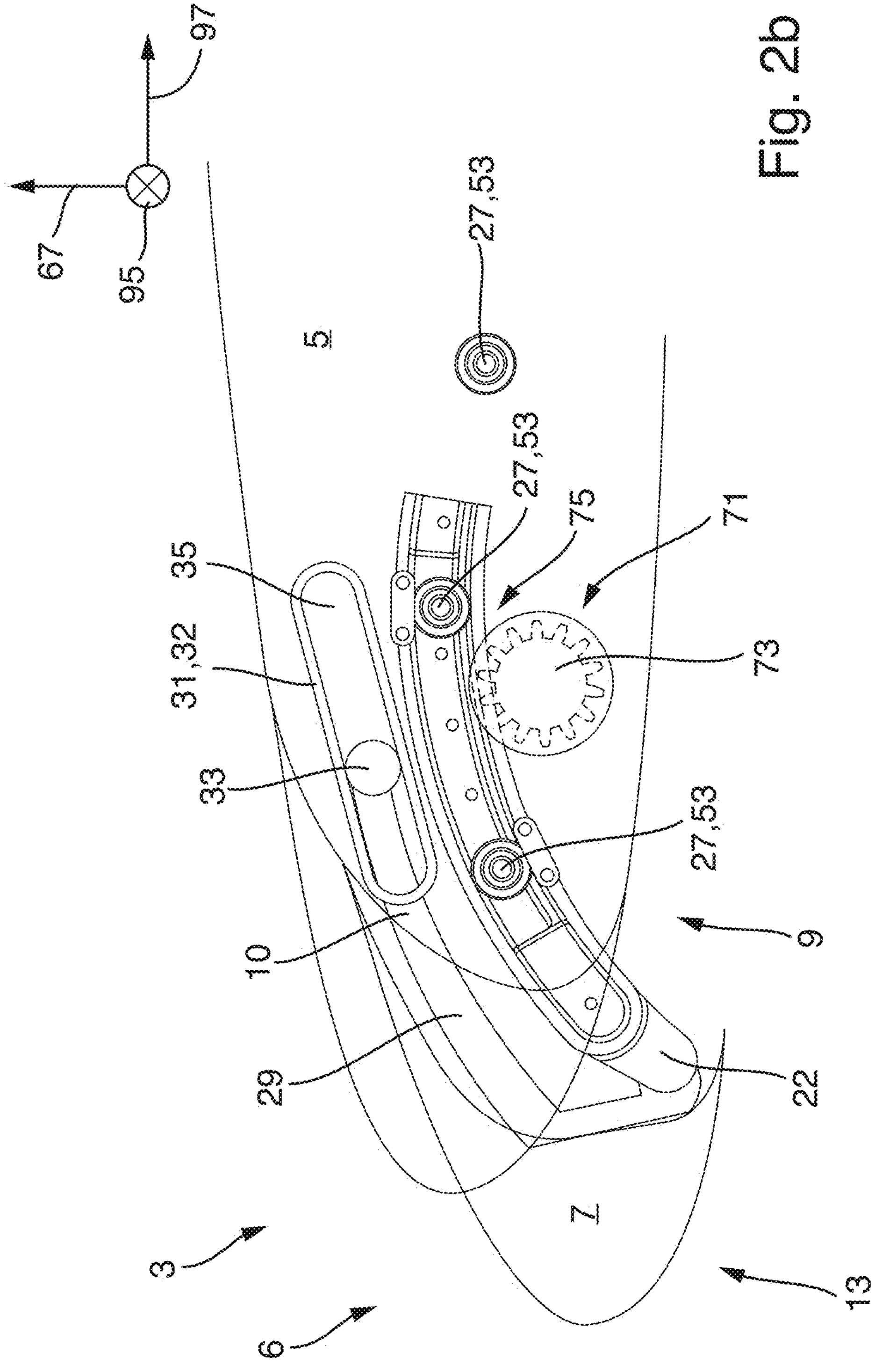
Figure 2C:
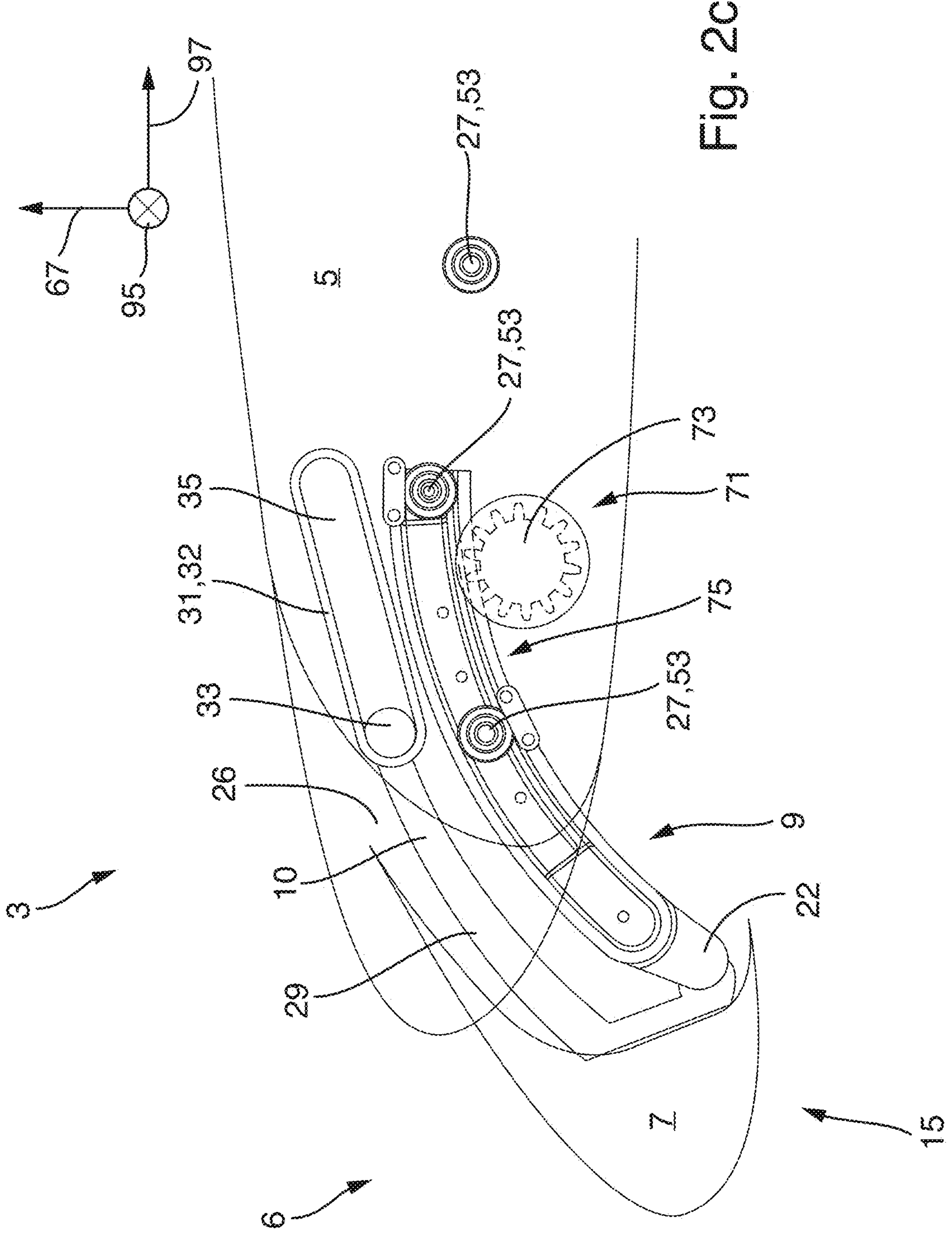
Figure 3:
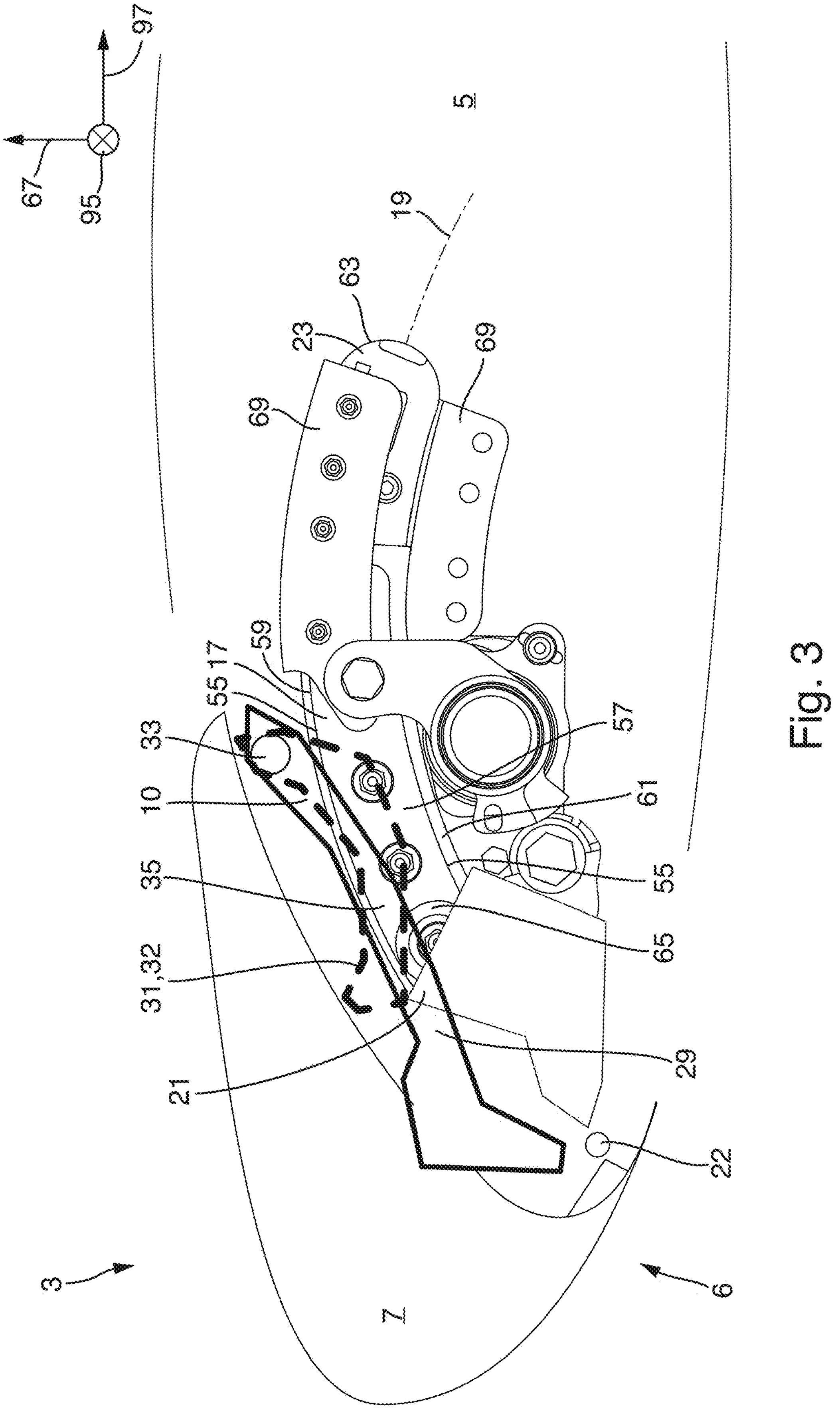
FIG. 3 is a side view of a wing according to an exemplary embodiment.
Figure 4:
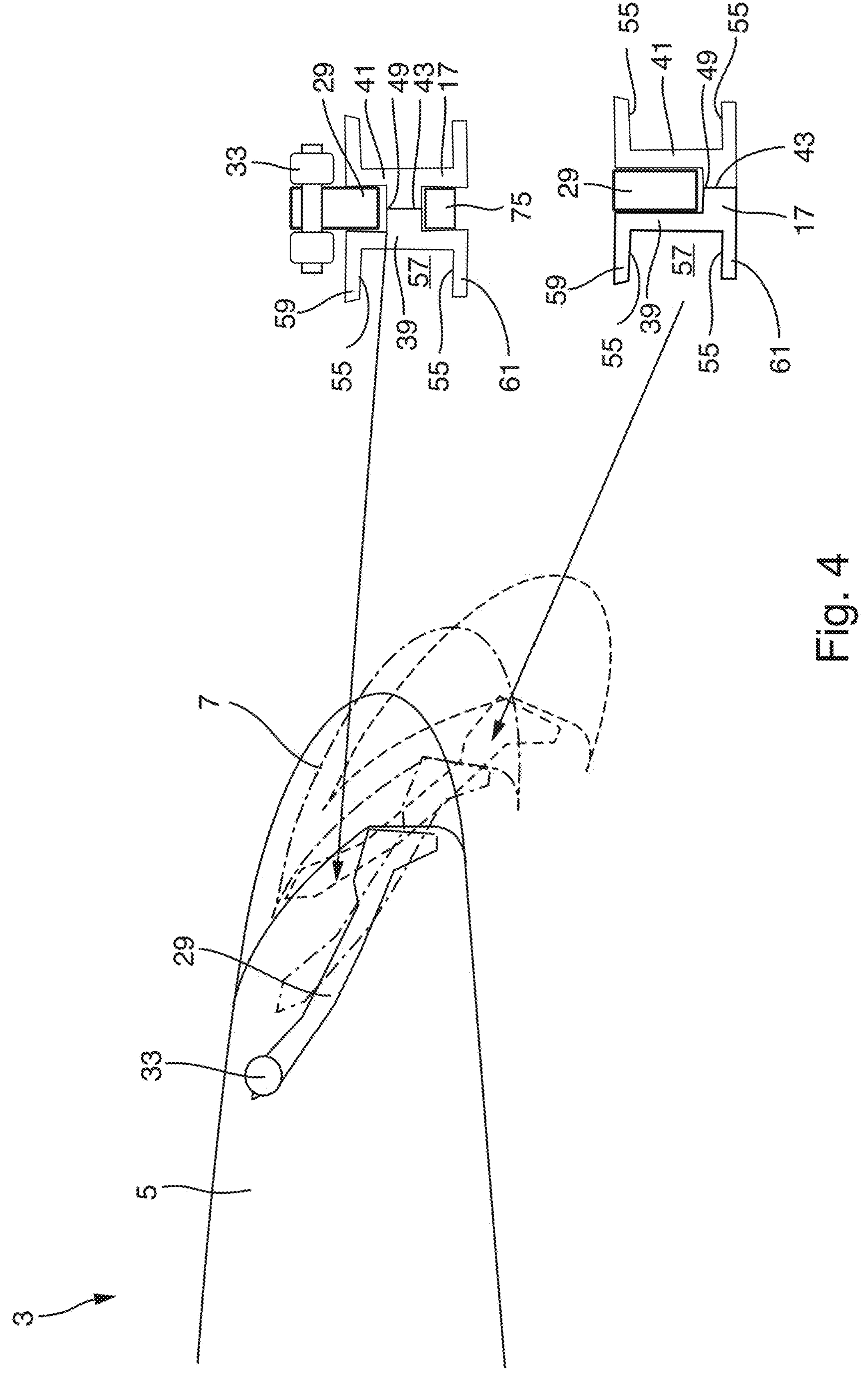
FIG. 4 is a schematic side view of the wing shown in FIG. 3 as moved between the retracted position, the first extended position and the second extended position, with two cross sectional views of the slat track and the slat angle lever at different positions along the track longitudinal axis.

FIGS. 2 to 4 illustrate two embodiments of the wing 3 according to an exemplary embodiment, as it might be employed, for example, in the aircraft 1 shown in FIG. 1.

FIGS. 2*a* to 2*c* illustrate a wing 3 according to an exemplary embodiment. As indicated in connection with FIG. 1, the wing 3 comprises a main wing 5 and a leading edge high lift assembly 6. The leading edge high lift assembly 6 comprises a slat 7 and a connection assembly 9 connecting the slat 7 to the main wing 5 such that the slat 7 is movable relative to the main wing 5 between a retracted position 11 (shown in FIG. 2*a*), a first extended position 13 (shown in FIG. 2*b*), and a second extended position 15 (shown in FIG. 2*c*). The retracted position 11 is intended for cruise flight, while the first extended position 13 relates to a partly extended position intended for take-off, and the second extended position 15 relates to a fully extended position intended for approach and landing of the associated aircraft 1.

The connection assembly 9 comprises a slat track 17 that extends along a track longitudinal axis 19 between a first end 21 and a second end 23, and has an intermediate portion 25 located therebetween. The slat track 17 in the present embodiment has a curved form along the track longitudinal axis 19 but may also have a straight form in other embodiments. The slat 7 is, in this example, mounted to the first end 21 of the slat track 17, although may additionally or alternatively be mounted to the intermediate portion 25 thereof. The slat track 17 is mounted to the main wing 5 by a roller bearing 27. The roller bearing 27 permits the track 17 to be moveable along the track longitudinal axis 19 relative to the main wing 5, and therefore also enables movement of the slat 7 relative to the main wing 5 between the retracted position 11, the first extended position 13, and a second extended position 15.

The slat track 17 is mounted to the slat 7 rotatably about a slat axis 22. The slat axis 22 extends in a span direction 95 and/or in parallel to a trailing edge of the slat 7 and/or in parallel to a leading edge of the main wing 5 and/or perpendicular to the track longitudinal axis 19. Further, the connection assembly 9 comprises a slat angle mechanism 10 mounted to the slat 7 and mounted to the main wing 5, wherein the slat angle mechanism 10 is configured to control the angle of the slat 7 about the slat axis 22 when the slat 7 is moved between the retracted position 11, the first extended position 13 and the second extended position 15. Specifically, the slat angle mechanism 10 is configured to control the angle of the slat 7 about the slat axis 22 in such a way that in the retracted position 11 and in the first extended position 13, the trailing edge of the slat 7 rests against the leading edge of the main wing 5, so that fluid cannot pass between the slat 7 and the main wing 5, whereas in the second extended position 15, a gap 26 is formed between the trailing edge of the slat 7 and the leading edge of the main wing 5 for fluid to pass through.

As shown in FIGS. 2*a*-2*c*, the slat angle mechanism 10 comprises a slat angle lever 29 and a lever guide 31. The slat angle lever 29 is mounted to the slat 7 and is guided by the lever guide 31 that is mounted to the main wing 5. The lever guide 31 is formed as a lever rail 32 and the slat angle lever 29 comprises a slat angle roller 33 engaging the lever rail 32 to roll along the lever rail 32 in a guided manner. The lever guide 31 forms a guide path 35 along which the slat angle lever 29 is guided, wherein the guide path 35 is formed in such a way that the slat angle lever 29 controls the angle of the slat 7 about the slat axis 22 in such a way that in the retracted position 11 and in the first extended position 13, the trailing edge of the slat 7 rests against the leading edge of the main wing 5, whereas in the second extended position 15, a gap 26 is formed between the trailing edge of the slat 7 and the leading edge of the main wing 5. In the present embodiment shown in FIG. 2, the form of the guide path 35 is straight, but in other embodiments, such as in the embodiment shown in FIG. 3, the form of the guide path 35 is not straight but rather curved and/or kinked, depending on the form of the slat 7, of the main wing 5, and of the slat track 17 and its travel path.

In the embodiments shown in FIGS. 2 and 3, the slat angle mechanism 10 is arranged in the same chord plane as the slat track 17, but in other embodiments the slat angle mechanism 10 may also be arranged in a different chord plane as the slat track 17, i.e. offset from the slat track 17 with respect to the span direction 95. The chord plane is spanned by the thickness direction 67 and a chord direction 97 of the wing 3. In the embodiment shown in FIGS. 2 and 3, the slat angle mechanism 10 is arranged above the slat track 17 with respect to a normal position of the related aircraft 1 on the ground, i.e. before the slat track 17 when viewed along a thickness direction 67 of the wing 3. In other embodiments, however, the slat angle mechanism 10 might be arranged below the slat track 17 with respect to a normal position of the related aircraft 1 on the ground, i.e. behind the slat track 17 when viewed along a thickness direction 67 of the wing 3.

In the embodiment shown in FIGS. 3 and 4, the slat track 17 has a form adapted to give space for the slat angle mechanism 10, in particular for the slat angle lever 29, to be arranged and move in close proximity or contact to the slat track 17, to allow for a minimum required space by the slat track 17 and slat angle mechanism 10 and thus a minimum required cut-out in the leading edge panel of the main wing 5. As illustrated in FIG. 4, the slat track 17 has a cross-sectional form across the track longitudinal axis 19 including a first side portion 39 and a second side portion 41 spaced from one another in the span direction 95, and a connection portion 43 connecting the first and second side portions 39, 41, to form at least one cavity 49 partially surrounded by the first and second side portions 39, 41 as well as by the connection portion 43. In the embodiment shown in FIG. 4, such a form is an H- and U-form, respectively, depending on the location of the cross section along the track longitudinal axis 19. The cavity 49 extends in an elongate manner in parallel to the track longitudinal axis 19. The cavity 49 is open in an upwards direction with respect to a normal position of the respective aircraft 1 on the ground. As visible in FIG. 4, the slat angle lever 29 extends at least partially within the cavity 49 and moves within the cavity 49 relative to the slat track 17.

As shown in FIGS. 2 and 3, the roller bearing 27 comprises at least two roller units 53, in particular three roller units 53 in the embodiment of FIG. 2 and two roller units 53 in the embodiment of FIG. 3, that are arranged spaced along the travel path of the slat track 17 along the track longitudinal axis 19. In the embodiment shown in FIG. 2, the roller units 53 are mounted to the main wing 5 and configured to engage a corresponding engagement surface 55 at the slat track 17. The engagement surface 55 in the embodiment of FIG. 2 is provided in a recess 57 formed in one or both lateral sides of the slat track 17. In particular, the engagement surface 55 is provided on the inner surface of an upper and lower flange 59, 61 surrounding the recess 57, so that two opposite parts of the engagement surface 55 face towards one another. In the embodiment shown in FIG. 3, the roller bearing 27 comprises a first roller unit 63 mounted to the second end 23 of the slat track 17 and configured to engage a guide rail 69 mounted to the main wing 5. The roller bearing 27 further comprises a second roller unit 65 mounted to the main wing 5 and configured to engage a corresponding engagement surface 55 at the slat track 17. The engagement surface 55 is provided in a recess 57 formed in one or both lateral sides of the slat track 17 between upper and lower flanges 59, 61, so that opposite parts of the engagement surface 55 face towards one another.

As shown in FIG. 2, the wing 3 further comprises a drive unit 71 mounted to the main wing 5 and coupled to the slat track 17 for moving the slat track 17 and hence the slat 7 between the retracted position 11, the first extended position 13, and the second extended position 15. The drive unit 71 in the present embodiment comprises a drive pinion 73 mounted to the main wing 5 in a driven manner and engaging a rack 75 provided at the slat track 17. In other embodiments, the drive unit 71 may also comprise a drive linkage driven by a rotating actuator or a linear actuator mounted at the main wing 5.

By the wing 3 and the leading edge high lift assembly 6 according to an exemplary embodiment and as described before, lift, drag, and noise generated can be adjusted along the movement path of the slat 7 between the retracted position 11, the first extended position 13 and the second extended position 15, so as to be most beneficial for the respective flight situations of cruise flight, take-off, and approach and landing. This means, an ideal ratio of aerodynamic performance and noise generated by extension of the slat 7 can be obtained for the respective flight situation.

While at least one exemplary embodiment is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment (s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A wing for an aircraft, comprising:

a main wing; and a leading edge high lift assembly comprising a slat, and a connection assembly movably connecting the slat to the main wing, such that the slat is movable between a retracted position, a first extended position, and a second extended position, wherein the connection assembly comprises an elongate slat track that extends along a track longitudinal axis between a first end and a second end and has an intermediate portion between the first and second ends, wherein the first end and/or the intermediate portion of the slat track is mounted to the slat, wherein the slat track is mounted to the main wing by a roller bearing such that the slat track is movable along the track longitudinal axis, wherein the slat track is mounted to the slat rotatably about a slat axis, the connection assembly further comprises a slat angle mechanism mounted to the slat and configured to control the angle of the slat about the slat axis when the slat is moved between the retracted position, the first extended position and the second extended position.

2. The wing according to claim 1, wherein the slat angle mechanism is configured to control the angle of the slat about the slat axis in such a way that in the retracted position and in the first extended position, the slat rests against the main wing, whereas in the second extended position, a gap is formed between the trailing edge of the slat and the leading edge of the main wing.

3. The wing according to claim 1, wherein the slat angle mechanism comprises a slat angle lever and a lever guide, wherein the slat angle lever is mounted to the slat and is guided by the lever guide, wherein the lever guide is mounted to the main wing.

4. The wing according to claim 3, wherein the lever guide is formed as a lever rail and the slat angle lever comprises a slat angle roller engaging the lever rail.

5. The wing according to claim 3, wherein the lever guide forms a guide path along which the slat angle lever is guided, wherein the guide path is formed in such a way that the slat angle lever controls the angle of the slat about the slat axis in such a way that in the retracted position and in the first extended position, the slat rests against the main wing, whereas in the second extended position, a gap is formed between the trailing edge of the slat and the leading edge of the main wing.

6. The wing according to claim 1, wherein the slat angle mechanism is arranged in the same chord plane as the slat track.

7. The wing according to claim 6, wherein the slat angle mechanism is arranged above or below the slat track.

8. The wing according to claim 6, wherein the slat track has a form adapted to give space for the slat angle mechanism to be arranged and move in proximity to the slat track.

9. The wing according to claim 8, wherein the slat track has a cross-sectional form including a first side portion and a second side portion spaced from one another in the span direction, and a connection portion connecting the first and second side portions, to form at least one cavity partially surrounded by the first and second side portions as well as by the connection portion, wherein the cavity is open in an upwards and/or downwards direction, wherein the slat angle mechanism extends at least partially within the cavity.

10. The wing according to claim 1, wherein the slat angle mechanism is arranged in a different chord plane as the slat track.

11. The wing according to claim 1, wherein the roller bearing comprises at least two roller units mounted to the main wing and configured to engage a corresponding engagement surface at the slat track.

12. The wing according to claim 1, wherein the roller bearing comprises a first roller unit mounted to the second end of the slat track and configured to engage a guide rail mounted to the main wing, and a second roller unit mounted to the main wing and configured to engage a corresponding engagement surface at the slat track.

13. The wing according to claim 1, further comprising a drive unit mounted to the main wing and coupled to the slat track for moving the slat track and hence the slat between the retracted position, the first extended position, and the second extended position, wherein the drive unit comprises a drive pinion mounted to the main wing and engaging a rack provided at the slat track, or comprises a drive linkage including at least one drive link and driven by a rotating actuator or a linear actuator mounted at the main wing.

14. An aircraft comprising a wing according to claim 1.

15. A leading-edge high lift assembly for a wing for an aircraft, comprising:

a slat, and a connection assembly configured for movably connecting the slat to the main wing, such that the slat is movable between a retracted position, a first extended position, and a second extended position, wherein the connection assembly comprises a slat track that extends along a track longitudinal axis between a first end and a second end and has an intermediate portion between the first and second ends, wherein the first end and/or the intermediate portion of the slat track is configurable to be mounted to the slat, wherein the slat track is configurable to be mounted to a main wing by a roller bearing such that the slat track is movable along the track longitudinal axis, wherein the slat track is configurable to be mounted to the slat rotatably about a slat axis, and the connection assembly comprises a slat angle mechanism configurable to be mounted to the slat and configurable to control the angle of the slat about the slat axis when the slat is moved between the retracted position, the first extended position and the second extended position.

16. An aircraft comprising a leading-edge high lift assembly according to claim 15.

* * * * *